United States Patent Office 3,228,860
Patented Jan. 11, 1966

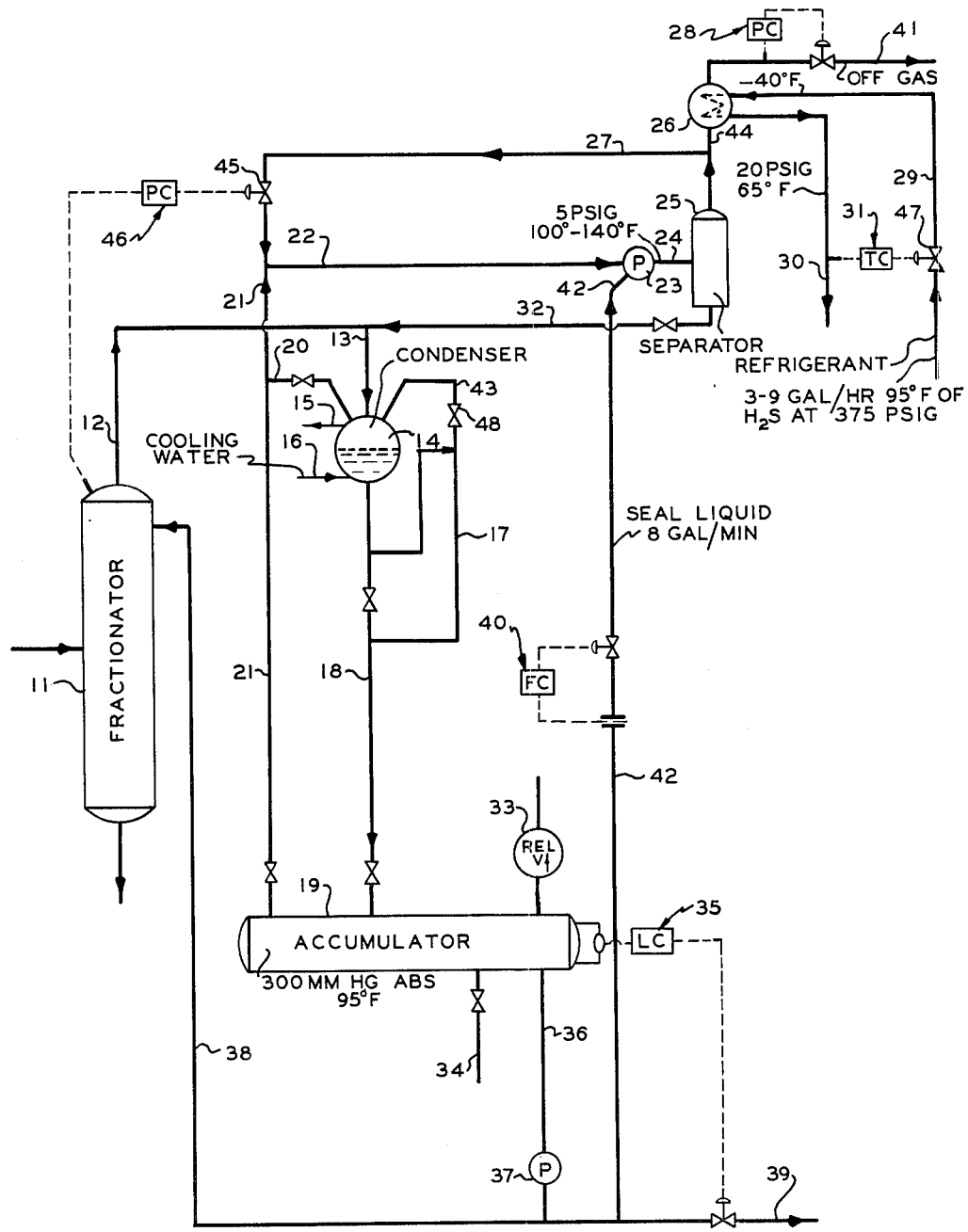

3,228,860
OVERHEAD VAPOR CONDENSER FOR COOLING LIQUID FOR ROTARY PUMP SEAL
Harold A. Larson, Bartlesville, Okla., assignor to Phillips Petroleum Company, a corporation of Delaware
Filed Sept. 18, 1961, Ser. No. 138,667
6 Claims. (Cl. 203—2)

This invention relates to the operation of fractional distillation systems under sub-atmospheric pressures. In one aspect it relates to vacuum distillation systems in which leakage air is separated and discharged from the system with a simultaneous increase in yield of overhead condensate product. In another aspect it relates to such a system which employs the overhead product liquid as a sealing liquid in the system's vacuum pump or pumps.

Prior art vacuum distillation systems employing vacuum pumps use an extraneous liquid as the pump sealing liquid. In such systems product vapors are contaminated with the pump sealing liquid and the contaminated vapors are thus lost or require subsequent and expensive processing for purification and recovery.

An object of this invention is to provide apparatus and a method for obtaining an increased yield of overhead product in vacuum distillation systems. Another object is to provide apparatus and a method for separating leakage gases from the overhead product of vacuum distillation systems and simultaneously increasing the yield of the overhead product or products. These and other objects and advantages of the invention will be realized upon reading the following description, which taken with the attached drawing, forms a part of this specification.

According to this invention I employ a portion of the overhead condensate as sealing liquid for the vacuum pump in a vacuum distillation operation in place of an extraneous sealing liquid. In this manner I do not contaminate overhead product or products with an extraneous sealing liquid. Since the vapors leaving the vacuum pump are not contaminated with an extraneous sealing liquid, I use a refrigerated condenser for obtaining additional condensate from the compressed vapors leaving the vacuum pump.

In vacuum distillation systems air leakage into the process equipment frequently occurs. In superatmospheric pressure systems leakage of material from the apparatus to outside is easily detected. But leakage from the atmosphere into an apparatus is difficult or substantially impossible to pinpoint. Thus, in such a system it may be necessary to employ process steps for removal of leakage atmospheric gases, i.e., nitrogen and oxygen and small amounts of $H_2S$ and butane as may accompany the nitrogen and oxygen. This invention, thus, involves apparatus and a method for removal of such gases from a vacuum distillation system. And furthermore, this invention involves a process in which increased yields of overhead condensate are obtained along with the simultaneous discard or rejection of the above-mentioned leakage gases.

The drawing illustrates in diagrammatic form an arrangement of apparatus parts for carrying out the process of this invention.

In the drawing, reference numeral 11 identifies a fractional distillation tower suitable for vacuum distillation. Conduits 12 and 13 lead overhead vapors from fractionator 11 to a condenser 14. Conduits 15 and 16 lead plant cooling water from and to condenser 14. Conduit 18 is provided for passage of condensate from condenser 14 to an accumulator vessel 19. Conduit 18 is valved, with the provision of a conduit 17 as illustrated for maintaining a predetermined liquid level in the condenser. A conduit 43 is provided for prevention of siphoning of liquid from condenser 14 into the accumulator. This conduit 43 provides communication from the uppermost level of conduit 17 to the vapor space in the condenser 14. A conduit 21 connects the normally vapor containing space of accumulator 19 with conduit 22 which leads to a vacuum pump 23. A conduit 20 connects the vapor containing space of condenser 14 with conduit 21. A conduit 24 leads compressed vapor from pump 23 into a separator 25.

A conduit 36 leads condensate from accumulator 19 to a pump 37 which discharges condensate either for reuse in the process or for removal as product. A conduit 38 leads that portion of a condensate which is required for a reflux into the upper portion of fractionator 11. A conduit 39 leads that portion of the condensate withdrawn as product to a point of disposal, not shown. The conduit 42 also conducts a portion of the condensate as the seal liquid into pump 23. The rate of flow of this seal liquid in conduit 42 is regulated by flow controller assembly apparatus 40.

A relief valve 33 is provided in case it is ever necessary to relieve pressure from within accumulator 19.

Separator 25 is provided at the discharge end of conduit 24 for separation of the seal liquid from the compressed gases from the compressor. The separated liquid flows through a conduit 32 and joins the overhead vapors from conduit 12 with the combined fluid stream flowing through conduit 13 into the condenser 14. Separated gases from separator 25 leave this separator and pass through a conduit 44 to a refrigerated condenser 26. From this condenser uncondensed or difficultly condensible gases, as nitrogen, oxygen, and small amounts of hydrogen sulfide, butene, and n-butyl mercaptan, leave the system by way of a conduit 41. A pressure controller or back pressure regulator 28 is provided for regulation of pressure in the portion of the system downstream from the vacuum pump 23.

For actual pressure control on the fractionator the bypass conduit 27 is provided for passage of a portion of the uncondensed gases from conduit 44 to conduit 22 on the inlet side of the vacuum pump 23. The flow of these returned gases through conduit 27 is controlled by manipulation of the motor valve 45. A pressure controller 46 actuates motor valve 45 in response to pressure in the fractionator 11.

The refrigerated condenser 26 can employ any suitable type of refrigerant providing it supplies a suitable condensing temperature. A refrigerant liquid is passed from a source, not shown, through a conduit 29 to an expansion valve 47 and thence the fluid passes through the condenser and exits therefrom through a conduit 30. A temperature controller assembly 31 actuates the expansion valve 47 in response to temperature in conduit 30 at a point near its outlet from condenser 26.

The refrigerant employed in the refrigeration system involving condenser 26 can be any suitable refrigerant which provides the required temperature. Since materials requiring subatmospheric processing frequently require low temperature condensers, such a refrigerant can be, for example, ethylene, ethane, propylene, propane, ammonia, hydrogen sulfide, or other refrigerant gas which is available.

In the present case because of the availability of liquid hydrogen sulfide in relatively large amounts and at suitable pressure, I employ liquid hydrogen sulfide as the refrigerant for producing the additional condensate in refrigerated condenser 26.

As an example of the operation of this process, I employ the fractionator 11 for making a separation between hydrogen sulfide, butene, and normal butyl mercaptan. The above-mentioned air or air components, hydrogen sulfide, butene and normal butyl mercaptan are the overhead vapors from fractional distillation column 11 passing through the overhead conduit 12. In the following Table I composition of the inlet and outlet materials to and from pump 23, distinguishing between vapor and liquid, are given at a pump outlet temperature of 100° F. In this case 36.4 moles per hour of liquid normal butyl mercaptan pass through conduit 24.

Table I

|  | Feed to Pump 23 Mols/hr. | | Pump Discharge 130° F. Conduit 24 Mols/hr. | | Ref. Cond. 26 Mols/hr., Off gas | Seal Liquid+ Absorbed Vapors |
|---|---|---|---|---|---|---|
|  | Vapor | Liquid | Vapor | Liquid | | |
| Air | 0.69 | | 0.69 | | 0.69 | |
| H₂S | 0.18 | | 0.18 | | 0.18 | |
| Butene | 0.36 | | 0.36 | | 0.33 | 0.03 |
| n-C₄SH | 0.12 | 36.4 | 0.12 | 36.4 | 0.015 | 36.505 |
|  | 1.35 | *36.4 | 1.35 | *36.4 | 1.215 | 36.535 |

*36.4 mols per hour equals 8 gal. per min. Condensate produced in refrigerated condenser 26=9.45 lbs. per hour.

The refrigerated condenser operating at a temperature of about −40° F. condenses approximately 9.45 pounds per hour of normal butyl mercaptan from the separator gases passing through the conduit 44 into the condenser. Thus, in this case when the pump discharge temperature is about 100° F. this 9.45 pounds per hour of normal butyl mercaptan is that amount of product which is saved over that produced in the prior art.

When the pump discharge temperature is about 130° F., the refrigerated condenser 26 knocks back 22.95 pounds of normal butyl mercaptan per hour and this 22.95 pounds per hour of normal butyl mercaptan is that amount of material saved. Table II gives pump inlet and outlet compositions, distinguishing between liquid and vapor, at a pump outlet temperature of about 130° F.

Table II

|  | Feed to Pump 23 Mols/hr. | | Pump Discharge 130° F. Conduit 24 Mols/hr. | | Ref. Cond. 26 Mols/hr., Off gas | Seal Liquid+ Absorbed Vapors |
|---|---|---|---|---|---|---|
|  | Vapor | Liquid | Vapor | Liquid | | |
| Air | 0.69 | | 0.69 | | 0.69 | |
| H₂S | 0.18 | | 0.18 | | 0.18 | |
| Butene | 0.36 | | 0.36 | | 0.29 | 0.070 |
| n-C₄SH | 0.12 | 36.4 | 0.27 | 36.25 | 0.015 | 36.505 |
|  | 1.35 | *36.4 | 1.50 | 36.25 | 1.175 | 36.575 |

*36.4 mols per hour equals 8 gal. per min. in conduit 42. Condensate produced in refrigerated condenser 26=22.95 lbs. per hour.

These two values, that is, 9.45 and 22.95 pounds of normal butyl mercaptan per hour might be considered not a markedly great increase in yield. However, when it is considered that the material sells for approximately 50 cents per pound, then in the 100° F. case the saving is $4.75 per hour and that hourly saving when considered over a period of a year makes an impressive saving. The 22.95 pounds per hour saved in 130° F. case makes a saving of approximately $11.50. This amount per hour when projected over a year of operating time also makes an important saving.

The vacuum breaker pipe 43, as illustrated in the drawing, is provided with a manually operable valve 48. This valve is provided for closing conduit 43 in case the vacuum breaking conduit is not required. When the vacuum breaker is required, then valve 48 is opened.

In this particular operation the pump 37, which is normally considered a reflux pump, serves three purposes: first, it serves as a reflux pump for pumping liquid through conduit 38 to the fractionator; it pumps product through conduit 39 to a point of disposal; and, further, it pumps liquid for pump sealing purposes through conduit 42 to pump 23. In addition, since this accumulator liquid 19 is used for pump sealing purposes, it has been previously cooled in the condenser 14. Also, the liquid, after it has passed through the pump 23 as the sealing liquid, is collected in separator 25 and is returned through conduit 32 to the condenser 14 for again cooling the liquid. Thus, condenser 14 serves the dual purpose of condensing product from the fractionator overhead vapors and further for cooling the seal liquid so that a separate cooler for the seal liquid is not required.

The valved conduit 34 is provided in case accumulator tank 19 ever needs to be drained of water or other liquid. A liquid level controller 35 regulates the rate of product withdrawal through conduit 39 in response to the level of liquid in the accumulator.

While these specific examples are given, they are given merely as examples of the operation of this process. The use of a liquid in process as the seal liquid for pump 23 does not contaminate in any manner the product of the operation. Since the product liquid is the pump seal liquid, the pump discharge can be condensed by refrigeration for increasing product recovery without danger of contamination of product with an extraneous material.

The pump which I use for pump 37 is such a pump identified as G Series Chempump, described in Bulletin 2050, and manufactured by the Chempumps Division of Fostoria Corporation, Buck and County Line Roads, Huntingdon Valley, Pa. These pumps are also described on pages 45–58, Chemical Engineering Progress, vol. 56, No. 7, July 1960, and also on pages 40 and 41 of Research and Development, vol. 11, No. 10, October 1960.

The pump which I use for the vacuum pump 23 is an H-4 type, single stage vacuum pump manufactured by the Nash Engineering Co., Norwalk, Conn., and described on a catalog page B-420, dated March 3, 1958, of that company.

While these particular pumps are used in this specific application, other suitable vacuum pumps or compressors can be used in place of this specific type of pump.

While certain embodiments of the invention have been described for illustrative purposes, the invention obviously is not limited thereto.

I claim:

1. A method for regulating the pressure in a fractional distillation zone operating under subatmospheric pressure wherein uncondensible gases enter the operation comprising withdrawing overhead vaporous product from said distillation zone at a subatmospheric pressure; condensing a portion of this withdrawn product thereby producing a condensate and uncondensed gases, these latter comprising said uncondensible gases; dividing said condensate into two portions; passing said uncondensed gases and one portion of said condensate into a compressing zone at a subatmospheric pressure and therein compressing the uncondensed gases, in the presence of said one portion of condensate as sealing liquid in said zone to a superatmospheric pressure; separating condensate from the compressed gases and combining the separated condensate with the first produced condensate; recycling a portion of these latter separated compressed gases into said compressing zone as a portion of the feed thereto; sensing the pressure in said distillation zone; and regulating the rate of said recycling into said compressing zone in response to the sensed pressure, thereby maintaining a predetermined subatmospheric pressure therein; and chilling in a condensing step the remainder of said latter separated compressed gases thereby producing additional condensate and uncondensed gases comprising said uncondensible gases as a final product, the first produced condensate and additional condensate being said overhead distillation product of increased yield.

2. An apparatus comprising in operable combination, a distillation column; means communicating with said column for condensing overhead vapors; a pump having a suction inlet communicating with aforesaid means, for compressing vapors from said column; means for recycling a portion of said compressed vapors to said suction inlet of said pump; means for sensing the pressure in said column; and means for regulating the rate of flow of said compressed vapors to said suction inlet in response to the sensed pressure in said column.

3. A process for maintaining a predetermined subatmospheric pressure in a distillation zone comprising the steps of:
 (a) condensing a portion of the overhead vapors from said zone to produce a condensate and uncondensed vapors;
 (b) compressing uncondensed vapors of step (a) in a vacuum pump to superatmospheric pressure and utilizing the suction pressure of said pump to maintain said subatmospheric pressure;
 (c) recycling a portion of the compressed vapors of step (b) to the suction intake of said pump;
 (d) sensing the pressure in said distillation zone; and
 (e) regulating the rate of recycle in step (c) in response to the sensed pressure so as to maintain said predetermined subatmospheric pressure.

4. The apparatus of claim 2 including means for passing condensate from said means for condensing to the suction inlet of said pump as sealing liquid in said pump; a gas-liquid separator connected with the outlet of said pump; a reflux refrigerated condenser connected with the outlet of said separator arranged to pass condened liquid back to said separator; and conduit means for passing condensate from the lower section of said separator to said means for condensing.

5. Apparatus comprising in combination:
 (1) a distillation column having an overhead vapor line;
 (2) a vapor condenser in the vapor line of (1) having a vapor space and a liquid space;
 (3) an overhead condensate accumulator connected by first conduit means with the liquid space of said condenser;
 (4) a liquid-sealed vacuum pump having a suction inlet and an outlet, said inlet being in communication with the vapor space of said condenser and with said column thru said vapor line;
 (5) a second conduit connecting said accumulator with the inlet of the pump of (4) having means therein for passing condensate to said pump as sealing liquid;
 (6) a vapor-liquid separator vessel connected by conduit means with the outlet of the pump of (4);
 (7) a third conduit connecting the liquid-containing space of the vessel of (6) with the accumulator of (3) for returning condensate thereto;
 (8) a fourth conduit connecting the vapor-containing space of the vessel of (6) with the inlet of the pump of (4) for recycling compressed vapor thereto;
 (9) means in the fourth conduit of (8) for regulating vapor flow therein;
 (10) pressure sensing means communicating with the column of (1) for sensing vapor pressure therein, said sensing means being in control of the means of (9); and
 (11) a reflux condenser positioned for returning condensate to the vessel of (6).

6. A process for operating a vacuum distillation column under subatmospheric pressure with simultaneous discharge of uncondensable gases and increased yield of distillation overhead product comprising the steps of:
 (a) withdrawing overhead vapor at subatmospheric pressure from said column;
 (b) condensing a portion of the vapor of step (a) to provide separate streams of condensate and vapor comprising said uncondensable gases and condensable vapor;
 (c) compressing the uncondensed vapor of step (b) in a pump, utilizing a portion of said condensate fed into same as sealing liquid, to provide said subatmospheric pressure in said column and a compressed effluent comprising said vapor and said sealing liquid;
 (d) passing the effluent from step (c) into a liquid-vapor separator so as to separate an overhead vapor stream and condensate sealing liquid as a bottoms stream;
 (e) chilling the vapor stream of step (d) to produce additional condensate and a vapor stream comprising said uncondensable gases;
 (f) recovering condensate of steps (b), (d), and (e) as a product of the process;
 (g) recycling condensate as sealing liquid to the pump of step (c);
 (h) venting the uncondensable gases from step (e) directly to the atmosphere;
 (i) recycling a portion of the compressed vapor stream downstream of step (c) to the inlet of said pump;
 (j) sensing the pressure in said column; and
 (k) regulating the flow rate of recycle in step (i) in response to the sensed pressure, thus controlling the subatmospheric pressure in said column.

References Cited by the Examiner
UNITED STATES PATENTS

| 1,890,152 | 12/1932 | Hills | 202—205 |
| 1,972,157 | 9/1934 | Miller | 202—205 X |
| 1,986,706 | 1/1935 | Beyer | 230—204 |
| 2,441,361 | 5/1948 | Kirgan | 202—75 |
| 2,457,315 | 12/1948 | Milleville | 202—69 |
| 2,637,684 | 5/1953 | Buffum | 202—75 |
| 2,714,573 | 8/1955 | Fessler | 202—69 |
| 3,102,083 | 8/1963 | Adams | 202—205 X |

FOREIGN PATENTS 781,505  8/1957  Great Britain.

OTHER REFERENCES

Brown: "Unit Operations," John Wiley & Sons, Inc., 1955, pages 181, 182.

NORMAN YUDKOFF, *Primary Examiner.*

ALPHONSO SULLIVAN, *Examiner.*